Aug. 29, 1939.　　　　C. R. MABON　　　　2,171,003
STRIP FEEDING AND ALIGNING MECHANISM
Filed Aug. 17, 1936　　　5 Sheets-Sheet 1
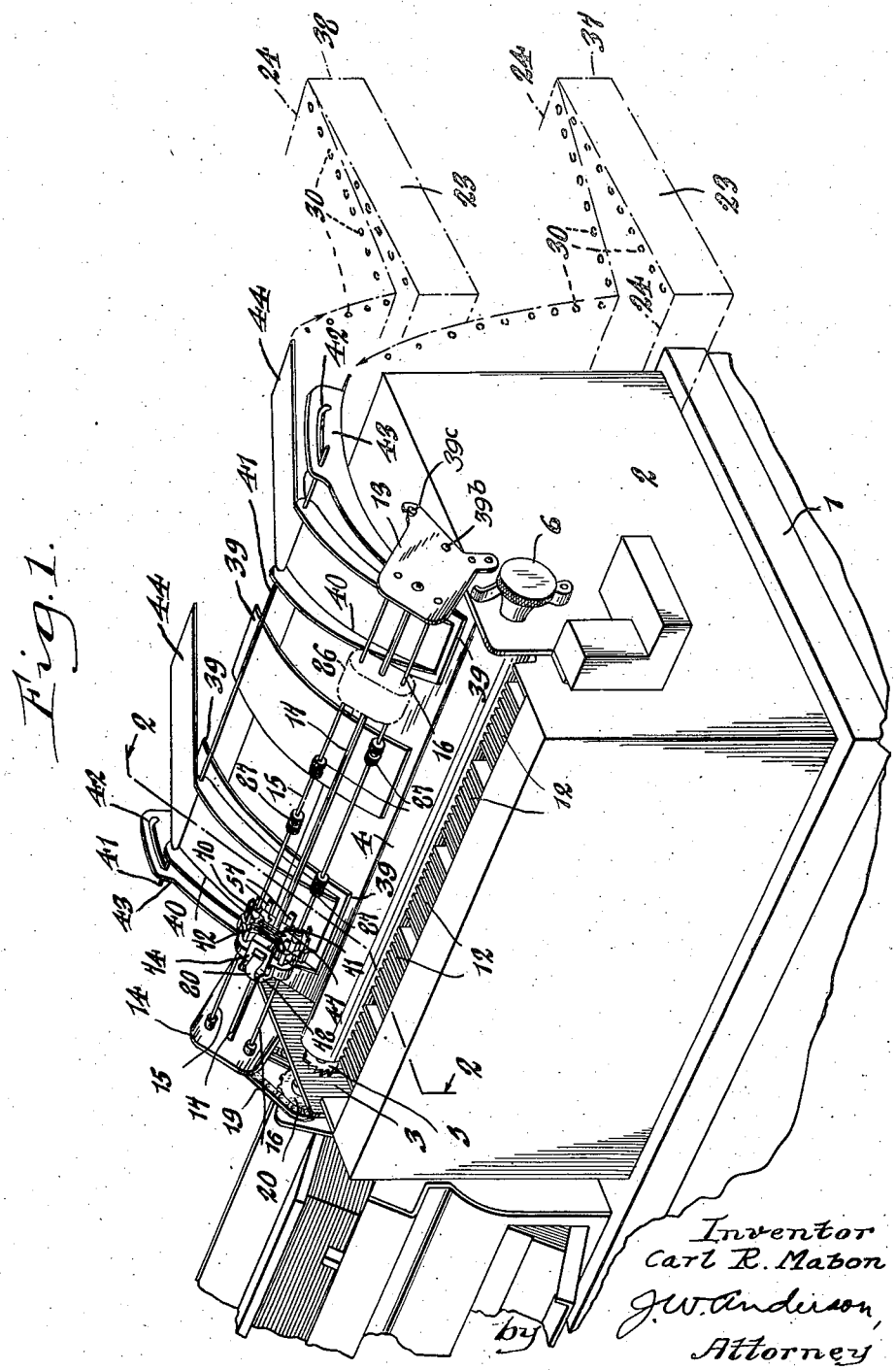
Inventor
Carl R. Mabon
by J. W. Anderson,
Attorney Aug. 29, 1939.  C. R. MABON  2,171,003
STRIP FEEDING AND ALIGNING MECHANISM
Filed Aug. 17, 1936   5 Sheets—Sheet 2
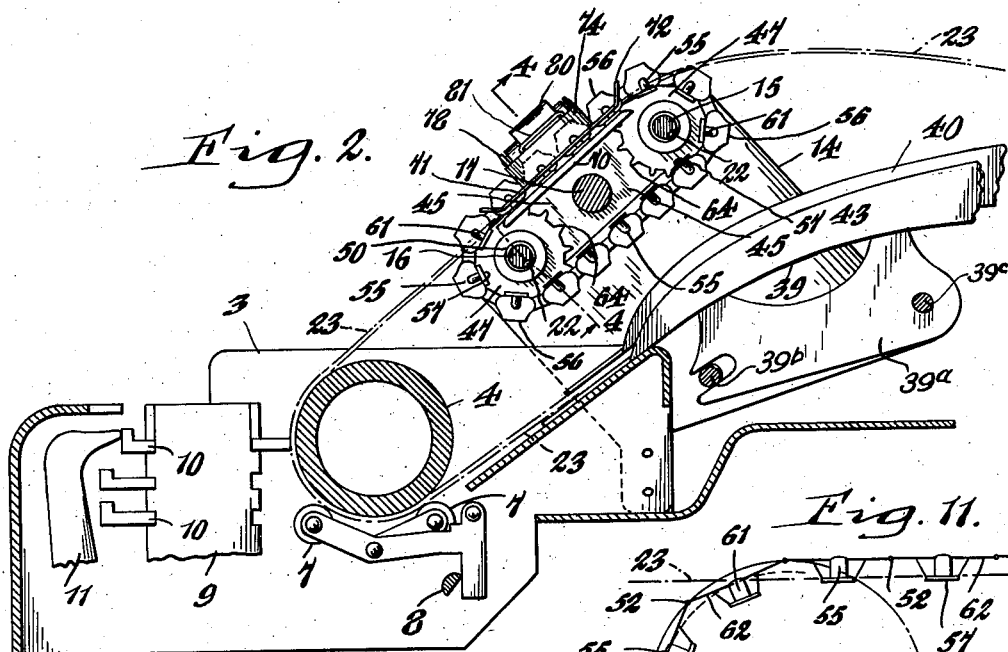
Inventor
Carl R. Mabon
by J. W. Anderson,
Attorney

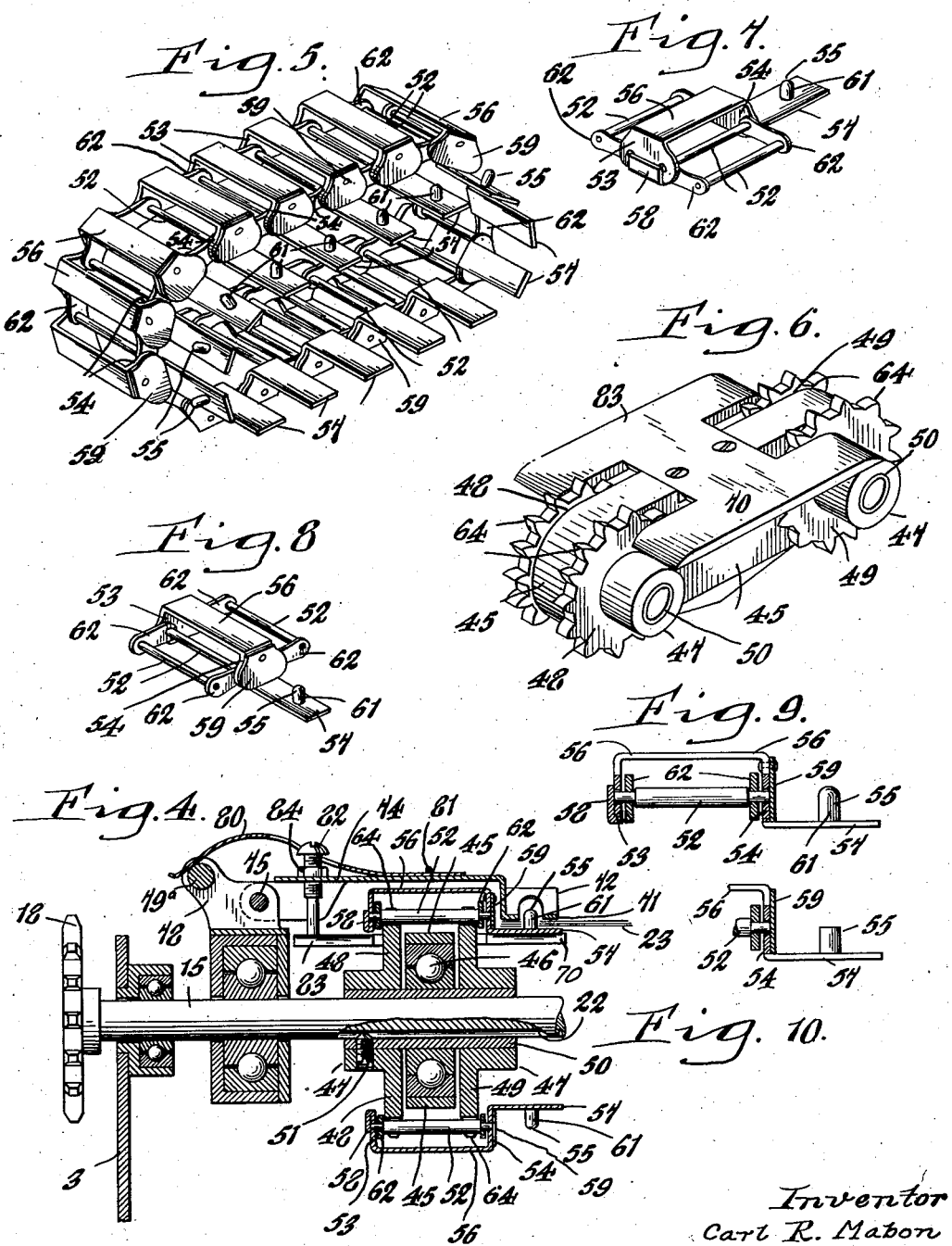

Aug. 29, 1939. C. R. MABON 2,171,003
STRIP FEEDING AND ALIGNING MECHANISM
Filed Aug. 17, 1936 5 Sheets-Sheet 4
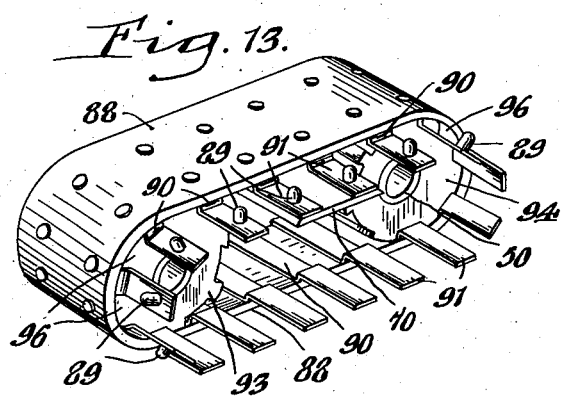
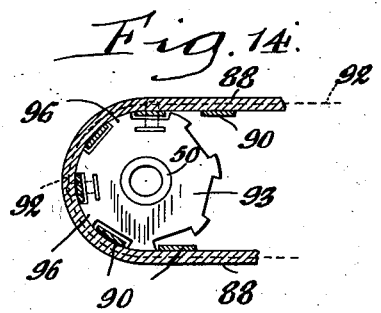
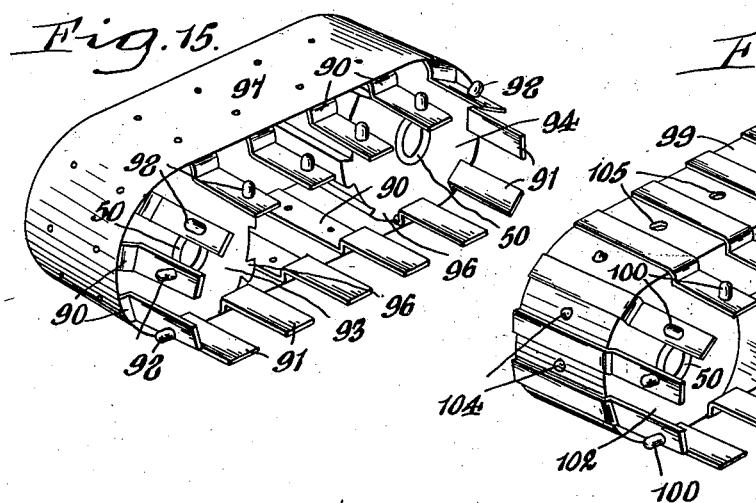
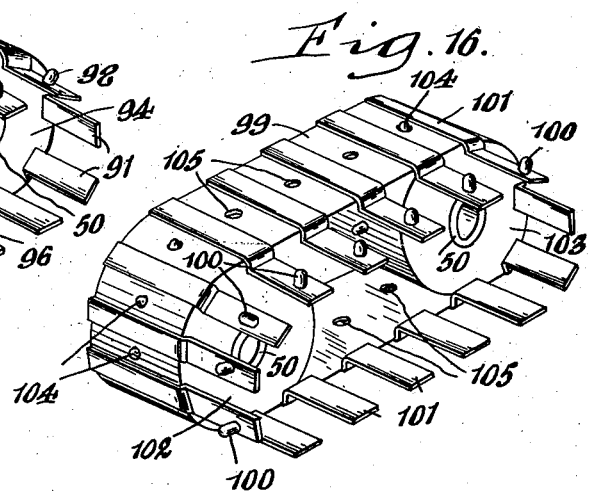
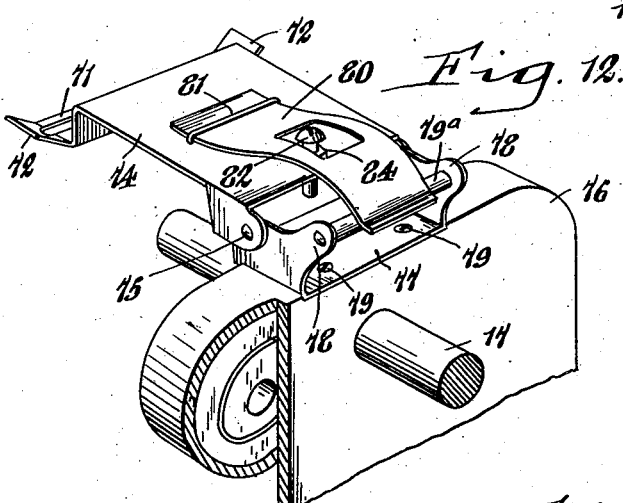
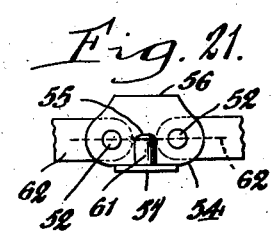
Inventor
Carl R. Mabon
by J. W. Anderson
Attorney

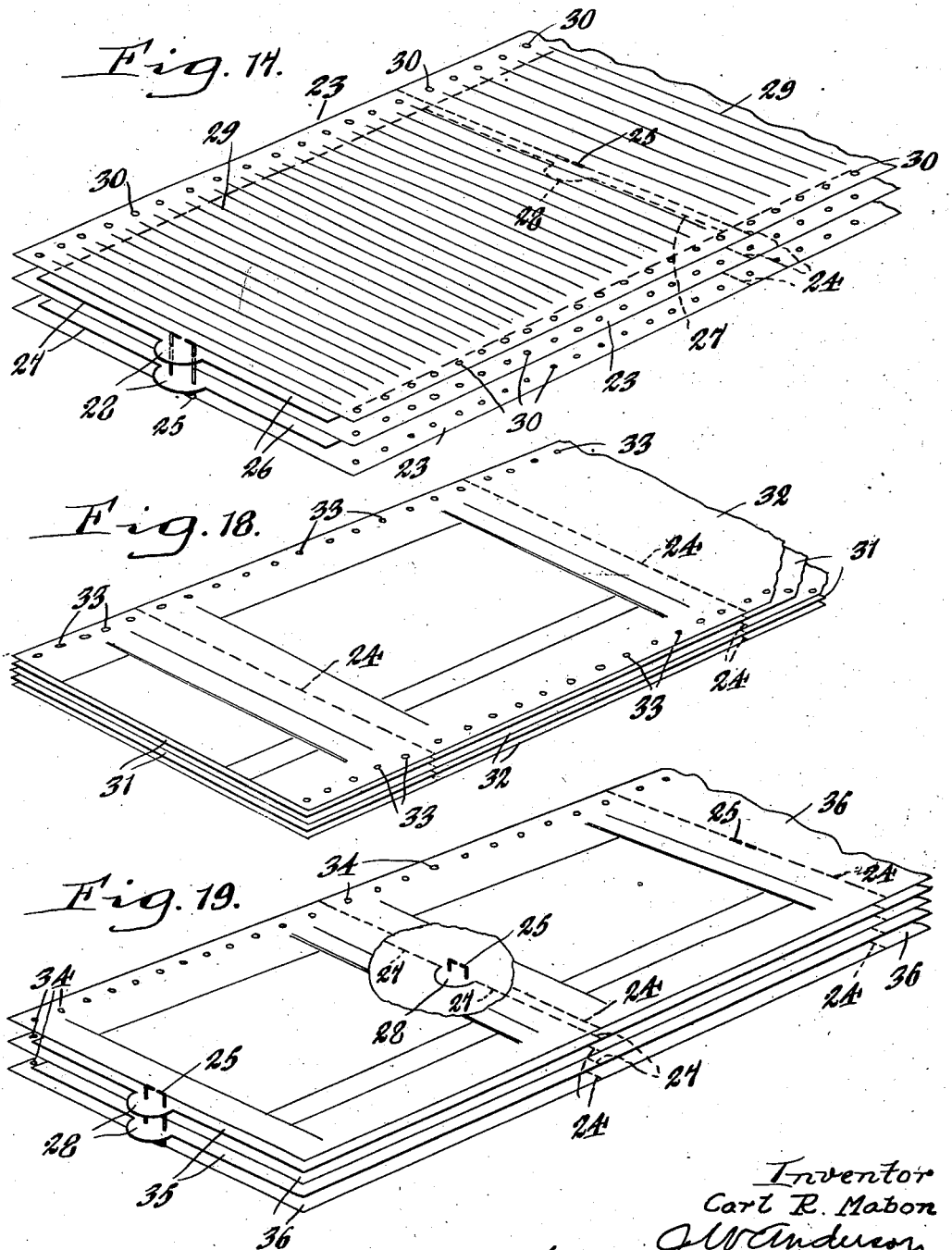

Patented Aug. 29, 1939

2,171,003

UNITED STATES PATENT OFFICE 2,171,003

STRIP FEEDING AND ALIGNING MECHANISM

Carl Robert Mabon, Niagara Falls, N. Y., assignor to Gilman Fanfold Corporation, Niagara Falls, N. Y., a corporation of Delaware Application August 17, 1936, Serial No. 96,516

60 Claims. (Cl. 197—133)

This invention relates to machines of various different types utilizable in recording data on record strips, such as ordinary typewriting machines of the various different designs; billing machines, tabulating machines; teletype machines; electric typewriters, so-called; autographic registers, and other recording machines, and has special relation to feeding and controlling the paper record strip, or strips, in its passage through such machines.

The general object of the invention is to provide an improved strip-feeding mechanism for machines of the class mentioned which will feed the strips accurately and keep them in accurate alignment with each other and correctly positioned with reference to the writing line at all times, while at the same time avoiding mutilation or other injury to the strips being fed.

A further and more particular object of the invention is to provide a strip-feeding mechanism of the type wherein feed pins or elements enter feed apertures formed in the strips, and having an improved arrangement and mounting of the pins whereby they are enabled to enter the strip apertures and to emerge therefrom more easily and effectively without tearing, mutilation or other injury to the walls or edges of the strip apertures, and also to more effectively align these strips and to maintain them in aligned condition.

A further object is to provide a strip feed of the pin type with an improved mounting and arrangement of the strip-aperture-engaging pins whereby said pins move substantially at the same rate of travel as the feeding strips at the moment that the pins enter into engaging relation with the apertures, as said pins are moved from a curvilinear into a rectilinear path, thus enabling the pins to enter the apertures or to leave them with a minimum of obstruction and without injury to the strips at the walls of the strip-apertures.

Still another object of the invention is to provide a strip feed mechanism of the pin type with an improved mounting and arrangement for the strip-engaging feed pins, enabling the pins to enter and leave the feed apertures of the strips relatively freely and unobstructed, so that the feed apertures of the strips may be reduced in size very nearly to the cross-sectional dimensions of the pins at the feed-engaging parts thereof. With this improved pin-mounting larger strip apertures are not needed, and in fact the operation of feeding and accurately aligning the strips is most satisfactory when the apertures are about the size of the pins, sufficient tolerance only being required in order that the pins may enter freely into the apertures without binding when in accurate alignment with said apertures.

A further object of the invention is to provide, in a strip-feeding mechanism of the pin type, an improved mounting and arrangement of the feed pins whereby the longitudinal spacing of said pins at the moment they enter or emerge from the strip apertures is substantially the same as the aperture spacing, even though said pins move in curvilinear paths at the points of aperture engagement or emergence. In this manner the pin entry into or emergence from the apertures is greatly facilitated and rendered relatively free from binding or other obstruction, and damage to the strips at or adjacent to the aperture margins is avoided.

Another object is to provide an improved mounting for aperture engaging pins of strip-feeding mechanisms whereby the feed-transmitting, aperture-engaging shafts or feed sections or parts of the pins are longitudinally spaced when positioned at the curved part of the flexible pin-supporting element or chain as the pins are bent to enter the strip apertures, approximately the same as the spacing of said feed-transmitting pin parts when positioned at a straight reach of said chain, thus facilitating entry of the pins into the apertures and emergence therefrom, and avoiding damage to the strips.

Another object is the provision of simple and practical line-spacing mechanism for machines of the class mentioned whereby the alignment of printed-form strips relative to each other and the printing point of the platen is much improved.

Another object is the provision of a practical and improved line-spacing mechanism of the pin feed type wherewith the strip or strips at the pin-engaged reach of the strips may be in a plane underneath or inside the plane of attachment of the pins to their operating devices, with consequent lowering of the center of gravity and increased stability of the strip assembly.

Another object is the provision of a simple and improved pin-feed mechanism for machines of the character described wherewith the edges of individual apertures in the strip may be relieved of much of the strain of feed so that there is little tendency to injure these edges or to crumble or otherwise injure the strip at the margins of the apertures.

Another object is to improve the action of line-spacing mechanism of the pin-feed type so that alignment of the strips relative to designed points in the machine or relative to each other may be effectively accomplished notwithstanding the sudden starting and stopping inherent in line-spacing action.

Another object is to improve the action on the strips of line-spacing mechanism of the pin-feed type when the line-spacing is effected automatically at rapid intervals of succession, as for instance in the power controlled and actuated line-spacing mechanism of tabulating machines, and other machines having power actuated line-spacing mechanism.

Another object is the provision of a simple and practical band of strip-feeding pins movable in an endless elongated path and wherein the terminals of the pins are substantially the same linear distance apart throughout the band as are the apertures in the strip to be fed, with consequent efficiency of registry between the pins and apertures though the strip and band of pins travel in different paths during strip feeding.

Another object is the provision of a simple and efficient band of strip-feeding pins movable in an endless elongated path and wherein the pins are stationary on the band and at distances apart corresponding to the apertures in the strip and wherein the terminals of the pins, in approaching the strip, move at substantially the same rate or velocity as the strip notwithstanding the strip and band of pins move in different paths.

Another object is the provision of a simple and practical band or chain of flexibly connected rigid links carrying strip-feeding pins in fixed relation to the links, respectively, and of such construction that the feed-sections of the pins may assume position in planes inside the plane of the line of centers through the pivotal connections of the links, with consequent capability of locating the plane of feed of the strip beneath, or inside, the plane of said line of centers and effecting engagement and disengagement of the pins and apertures without injuring the strip.

Another object is the provision of a simple and practical band or chain of flexibly connected rigid links carrying strip-feeding pins in fixed relation to the links, respectively, and of such construction that the feed-sections of the pins may assume positions in planes inside the line of centers through the pivotal connections of the links, with the terminals of the pins in position efficiently to engage the apertures in the strip, as by terminating the pins at or close to the said plane of the line of centers.

Another object is the provision of a practical and durable pin-feeding mechanism having a chain of rigid, pivotally connected links carrying strip-feeding pins at the side of the chain and inside or below the upper or outer surface of the chain, the pin-carrying links of the chain having relatively simple construction for accommodating the pivots as well as laterally projecting supports for the strip-feeding pins.

Another object of the invention is the provision of a simple, practical and improved pin-feeding unit which of itself is adapted for efficiently guiding the strip, though applied at one side only of the margin of the strip.

Another object of the invention is the provision of a simple and practical pin-feeding mechanism efficiently cooperable with strips having apertures of small tolerance relative to the pins and without injuring the strips.

Other objects of the invention will be in part pointed out in the subjoined detailed description of certain illustrative but preferred embodiments of the invention and will be in part obvious in connection therewith.

The invention accordingly comprises the features of construction, combination of elements, and arrangements of parts which will be exemplified in the construction hereinafter set forth, and the scope of the application of which will be indicated in the claims.

This application is a continuation in part of applicant's prior application Serial No. 54,102, filed December 12, 1935, to which reference is made.

In the accompanying drawings forming a part of this specification and wherein similar reference characters refer to similar parts throughout the several views:

Fig. 1 is a perspective view, partially diagrammatic, illustrating the invention as applied to a recording machine;

Fig. 2 is an enlarged sectional elevation taken, substantially, on the line 2—2 of Fig. 1 and showing details of the construction and arrangement of the mechanism of Fig. 1;

Fig. 3 is a fragmentary elevation of Fig. 1 showing details of the feed drive;

Fig. 4 is a sectional view taken, substantially, on the line 4—4 of Fig. 2 and showing details of the mounting and arrangement of the feed pins;

Fig. 5 is an enlarged perspective view of the chain form of flexible band with feed pins mounted thereon;

Fig. 6 is a perspective view of the frame of the pin feed unit of the feed mechanism with sprocket wheels mounted thereon;

Figs. 7 and 8 illustrate details of links of the chain having pins mounted thereon;

Fig. 9 is a transverse, sectional view through the pivotal axis of one of the pin carrying links of Fig. 5;

Fig. 10 is a similar view to Fig. 9, but illustrating a modified form of feed pin;

Fig. 11 is a diagrammatic view illustrating the general relation of the pin-feed mechanism when the chain form of flexible band is employed;

Fig. 12 is an enlarged detailed perspective view of a strip guiding element or device in associated relation;

Fig. 13 is a perspective view illustrating a modified form of band, feed pins and band support, the band being relatively thick and of flexible material;

Fig. 14 is a longitudinal sectional view through one end of Fig. 13;

Fig. 15 is a view of another modified form of band of flexible material, this band being relatively thin, the feed pins also being shown;

Fig. 16 is a generally similar view to Fig. 15, the pins being affixed to the band in a slightly different way;

Fig. 17 is a perspective, diagrammatic view of one form of stationery or strip which may be used with the feed mechanism of the present invention;

Figs. 18 and 19 diagrammatically illustrate other and different forms of stationery which may be used with the feed mechanism of the present invention;

Fig. 20 illustrates a conventional form of ratchet device which may be employed for effecting line-spacing action of the pin-feeding mechanism, and of the platen;

Fig. 21 is a diagrammatic side view of an associated pin and link.

Referring now more particularly to the drawings, the invention is illustrated as applied in a tabulating machine utilized for typing record-strips. As the construction and operation of the ordinary tabulating machine is well known, a brief reference thereto will suffice for an understanding of the relation of the present invention thereto. The numeral 1 indicates a part of the main frame of the tabulating machine; upstanding are the side frame pieces 2 and 3 in which the cylindrical platen 4 is mounted for rotation. It is to be understood that in the tabulating machine the platen 4 is automatically rotated step by step in effecting line spacing, this line spacing action being effected by suitable connections from the platen to the controlling and actuating mechanisms of the machine. Ordinarily, to the platen or platen shaft is affixed a ratchet wheel 5 rotated to effect line spacing at controlled intervals by a suitably mounted pawl or tooth to which oscillatable movement is imparted through the lower mechanism of the machine. (See Fig. 20, hereinafter more particularly described.) In the ordinary tabulating machine the platen 4 is usually stationary longitudinally of its axis. It is to be understood, however, that the present invention is not limited in its application to longitudinally stationary platens, but is applicable in machines wherein the platen is mounted for longitudinal reciprocal movement with a shiftable platen carriage, such as ordinary typewriting and other machines.

The numeral 6 indicates a disk or handle by which the platen 4 may be manually rotated in either direction when desired. Beneath the platen 4 are the usual feed rolls or gripper rolls 7, which are shiftable toward the platen to cause sufficient grip on the record strips to effect feeding of these strips when the platen is rotated. These rolls may be shifted away from the platen so that the platen may be rotated loosely in the path of the record strip passing therearound. By manually actuating the cam piece 8 the roll 7 may be shifted as just described, and as usual in tabulating machines and other typewriting machines. It is to be understood, however, that the present invention is not limited to machines of the character referred to having rotatable platens, but may be used in machines provided with stationary platens or platens of other than circular cross-section.

In the front part of the tabulating machine are the vertically movable shifters 9 each carrying a number of relatively superposed type bars 10, the bars 10 being mounted in the shifter 9 for movement to and from the plane of the platen 4, each bar 10 having a numeral or other character for imprinting or typing the record strip at the printing line of the platen. By power actuation of the tabulating machine the shifter 9 is raised or lowered so as to select and set the particular type bar in line with the platen for making the imprint on the record strip, the selected type-bar 10 being driven to effect printing, or typing, by the hammer or type-bar actuator 11, the type-bar retreating from the platen under the influence of a spring or other suitable device. In this wise either of a series of numerals or letter characters from 0 to 9 may be typed on the record strip at the printing point, line spacing being automatically effected between the intervals of printing the lines. A row of a plurality of type-bar shifters 9 equipped with the type-bars 10 and a row of hammers are employed and either or all of the type bars on these shifters and at the printing point may be actuated to type simultaneously; thus lines of any series of numerals may be printed on the record strip. Usually the record strip is wide so that different vertical columns of figures may be typed on the record strip. To provide for additional columns additional type-bar shifters 9, type-bars 10 and hammers 11 may be used. Banks or sets each of a plurality of type bar shifters, for the different columns are illustrated diagrammatically in Fig. 1 by the numerals 12, all automatically actuated and controlled through the power of the machine.

In a tabulating machine, the selection of the particular shifter and type-bar 10 to be actuated and the actuation thereof to effect typing may be accomplished through the instrumentality of a card, which may be of paper of suitable consistency. Each card may have a small hole therein. When such a card is fed into the tabulating machine, the mechanism is set in operation selectively in accordance with the position of the hole in the card, and the particular type-bar 10 corresponding to the position of the hole will be caused to print, and thereupon line spacing or feeding of the record strip will also be automatically effected by rotation of the platen 4 preparatory to subsequent typing by the same or a different selected type-bar 10. Whereas the invention is disclosed in its association with a tabulating machine in which the operations of typing, selection of type, and line spacing are effected without the intervention of the operator, this invention is not limited thereto but is applicable in those constructions of record making machine wherein the operator makes the selection of type, actuates the same and effects the line spacing movement of the record strip, as for instance in an ordinary typewriting machine having a shiftable platen carriage and a keyboard, and manually operated keys of which exhibit letters, numerals, etc., and the usual manually actuated devices for effecting line-spacing, letter spacing and the other well known operations of typewriting machines. In other words, the tabulating machine is merely one form of typewriting machine for which this invention is adapted.

For mounting the strip feeding mechanism of the present invention to cooperate with the record strip, a practical supporting structure is employed. As illustrated, brackets 13 and 14 are detachably mounted in stationary position on the side pieces 2 and 3 of the frame of the machine. Two parallel shafts 15 and 16 are rotatably supported on these brackets. Between the shafts 15 and 16 is a rod or cylindrical bar 17, which is also supported by the brackets 13 and 14 and is preferably fixed against rotation in the brackets. Either of the shafts 15 and 16 may be rotated to effect feed or line spacing and control of the strip by the pin-feed mechanism hereinafter more fully described. In the present instance the shaft 15 is arranged to actuate said pin-feed mechanism. Shaft 15 extends through the bracket 14 and has a sprocket-wheel 18 affixed thereto and driven by sprocket-chain 19 from a sprocket-wheel 20 mounted on an extension of the shaft 21, which latter is actuated by the ratchet wheel 5 in consonance with line-spacing action of the strip feeding mechanism, so that as the ratchet wheel 5 is rotated the chain 19 and the sprocket-wheels 18 and 20 are also actuated. Should it not be desired at all times to rotate the platen 4 by the ratchet-wheel 5, a suitable loose connection may be provided between the ratchet-wheel and platen permitting the ratchet 5 to rotate without turning the platen 4, but nevertheless to actuate this feed mechanism. The rotatable shafts 15 and 16 may each have a longitudinal groove 22 for purpose hereinafter described. The two shafts 15 and 16 and the rod 17 provide transverse supporting members for the pin feed unit of the feeding mechanism later fully described.

The stationery or record strips with which the feed mechanism operates may be of any practical character and may consist of one or a plurality of long, continuous, relatively superposed, paper record strips. The invention possesses special advantages in feeding, controlling and aligning continuous stationery consisting of a number of relatively superposed record strips and interleaved transfer strips, each record strip having a longitudinal series of similar printed forms, as for instance transverse, printed, parallel guide lines, on or between which lines it is desired to type and to multiply the original imprint in the same relative position on each underlying record strip as on the original record strip. Accurate superposed registration of such kind has heretofore been difficult to attain, and much time and stationery have been wasted in the effort notwithstanding the use of feed mechanisms of different and complicated construction.

As illustrative of stationery which may be employed reference may be made to Fig. 17, wherein the numerals 23 indicate advance portions of relatively superposed continuous, long paper record strips, each divided into a longitudinal series of form lengths or "forms" by transverse weakening lines, or lines of perforations, 24, these weakening lines being distributed at form length intervals longitudinally throughout the assemblage, the strips 23 being connected together by staples 25, or other suitable means. The staples pass through the assemblage of strips and are located directly on and along the weakened lines and so related that when the assemblage is parted along the weakening lines 24, the parted record sheets automatically become free of attachment by the staples. Interleaved with the record strips 23 are the transfer, or carbon strips, 26, in this instance narrower than the record strips, but also held in the assemblage by the staples. The transfer strips 26 also have a series of transverse perforations or weakening lines 27 in superposed registry with the lines 24 in the record strips. The weakening lines in the transfer strips diverge around the staples in Fig. 17, and this diverging section may be slit to provide a short tongue or tab 28 (shown more clearly in Fig. 19), in each transfer strip adjacent the respective staples. Thus, when a set of forms is parted from the continuous assemblage, as for instance by being torn along registering weakening lines, the transfer sheets of the torn-off set remain attached together by the staples, whereas as before explained, the torn-off record sheets become free of attachment by the staples.

The record strips illustrated in Fig. 17 are each printed with the parallel guide lines previously referred to, and indicated by the numerals 29. In the machine the point of imprint of the type on the strips is designed to be in accurate relation to these guide lines, either directly on the respective lines or between the two next-adjacent lines. It will be seen, therefore, that as these guide lines may be close together and spaced apart barely more than the height of the imprint to be made, it becomes a matter of moment to longitudinally align each strip relative to the printing point or line at the platen and relative to each other, so that not only shall the imprint on the original strip be made in designed relation to the particular guide line but also the transferred imprint to underlying strips shall be in the same relation to the corresponding guide lines of the underlying strips. The attachment between the strips, as by the staples, is promotive of and participates in effecting imprint in accurate designed position on each of the superposed strips, but it is to be understood that the invention in its broadest aspect is not limited to the use of attached strips. Relatively superposed independent strips may be employed.

In Fig. 17 each margin of each record strip is equipped with a row, or series, of feed apertures, indicated by the numerals 30, at equal distances apart in all the strips, the edges of the transfer strips 27 being sufficiently to one side of these apertures to permit the feed-pins, hereinafter more particularly described, freely to enter and leave the apertures 30. In Fig. 18, which also shows advance portions of relatively superposed, long continuous record strips, the several strips are not attached together, and the transfer or carbon strips 31 are of the same width as the record strips 32. In Fig. 18 each strip has a row, or series, of feed apertures 33, like those in Fig. 17 and at each margin of each strip. In Fig. 18 the printed forms on the strips are of the conventional character suitable for billing, such as more commonly employed in a recording machine like the ordinary typewriter, although of course stationery like that of Fig. 18 may be used in a tabulating machine. In Fig. 19, it will be observed that the feed apertures 34 are at one margin only of the stationery, being shown in the record strips only. The transfer strips 35 are similarly related to the series of feed apertures 34 as they are at one margin in Fig. 17, but extend to the opposite edges of the record strips 36, there being in this instance no feed apertures in the transfer strips. Also in Fig. 19 the strips are attached together by stapling as in Fig. 17. Of course, if desired the transfer strips may have feed apertures, as in the record strips, and be disposed for being fed by the feed pins.

The relatively superposed record strips supplied to the machine may be zig-zag folded on the transverse weakening lines, as 24, in the strips to form a convenient supply pack, as diagrammatically illustrated at 37 in Fig. 1, and the strips led from this pack to beneath the platen 4 and then around the platen and in feeding relation to the pin-feed mechanism, and they may be delivered from the machine so as to refold into a similar zig-zag folded pack of typed stationery, as diagrammatically illustrated at 38 in Fig. 1.

In case it is desired to employ edge-guiding means for the stationery, a form of edge guide and strip support which may be utilized is disclosed in applicant's co-pending application, Serial No. 757,502, filed December 14, 1934, Patent No. 2,077,-428, April 20, 1937, to which reference is made. Parts of such a strip support and edge guiding device are illustrated in Figures 1 and 2. On its approach to the platen 4, the strip may slide on the strip supporting guide plates 39, the strip being tensioned and kept smooth by the pivoted weights 40 resting on the strip and loosely hinged to a bar or rod 41, slidable longitudinally of the strip path in slots 42 on the flanges 43 of the supporting plates 39. The strip delivered by the pin feeding mechanism may pass over rearwardly projected supporting plates 44 and may refold zig-zag into pack form as at 38. By shifting the rod 41 from its forward position in Fig. 1 to the opposite ends of slots 42, the weights 40 are withdrawn from position directly beneath the pin-feed mechanism so as to permit these weights to be turned up out of the way. The strip supporting guide plates 39 may be mounted on the machine in proper relative position to the platen by devices similar to those disclosed in the aforesaid Patent No. 2,077,428 or in any practical way. The flanges 43 serve as edge guides for the strip, and the plates 39, 44 and weights 40 may be shifted on their supports transversely of the path of feed of the strip to any desired positions and so as to accommodate record strips of different widths. If desired, the strip supporting, guiding and tensioning members at one side of the strip may be removed altogether, those at the other side remaining. Or these edge guide and strip supporting plates may not be used at all, under certain circumstances.

As illustrated, a series of pins is employed to feed and align the strip or strips. These pins enter the strips to attain feed engagement therewith and are positioned, moved and controlled as hereinafter explained.

In the present embodiments the pin-feeding mechanism is shown as spaced a distance ahead of the platen 4 so as to feed or draw the strip over the platen, whence it is led or drawn in a determined path to and through the pin-feed mechanism and then the strip is delivered from the machine. Thus the pin-feed mechanism may easily be adapted as an attachment for existing machines. The rotatable shafts 15 and 16 are spaced apart longitudinally of the path of the strip, and on these shafts and the bar 17 is supported the frame member 45 of the pin feed unit of the feed mechanism. This pin feed unit is supported in operative position by these transverse supporting members 15, 16 and 17. As illustrated, this frame member 45 may be a rigid, solid block of metal, bored in the center for passage of the cylindrical supporting rod 17. Also each end of the block 45 is cored out for reception within the block of the ball bearing assemblage indicated generally at 46 in Fig. 4. Similar ball bearings are arranged at each end of the frame block 45.

The shafts 15 and 16 extend through the frame member 45, and each has a sprocket-wheel mounted thereon for rotative movement, as indicated generally at 47, Fig. 4. As the constructions of the sprocket-wheels and their mounting in the frame 45 may be similar, but one will be described in detail. Each sprocket-wheel embodies the toothed, concentric sprocket-wheel sections 48 and 49 between which the block 45 lies, these sections being firmly connected together by the sleeve 50 on which they are tightly fitted to rotate together as a unit, the sleeve 50 being rotated by the shaft 15 or 16 passing therethrough, as shown in Fig. 4. A strong pin, such as a screw 51, is threaded in the hub of each sprocket-wheel and may be turned to extend through the sleeve 50 into engagement with the longitudinal groove 22 in the shaft, so as to compel simultaneous rotation of the sprocket-wheel sections with the rotary shaft 15 or 16 on which they are mounted and to lock the sprocket-wheel sections in predetermined position longitudinally of such shaft. By loosening screws 51 the sprocket-wheels and the block 45 may be shifted or adjusted to different positions longitudinally of the shafts and of the bar or rod 17, for setting the feed mechanisms for operation for feeding strips of different widths or requiring different positioning of the pin-feed mechanism.

A pin-guiding member, or element, is utilized and may take different specific forms. In the type of feeding mechanism employing a chain of links as the pin-guiding element, it is to be understood that chains of various different constructions may be employed without departing from the broader aspects of the invention. The chain specifically described herein lends itself readily to the accomplishment of the ends of the invention and is very practical and efficient. As shown, the chain is driven by one of the sprocket-wheels 47 and provides one form of flexible band or carrier for guiding and driving the feed pins in effecting feed of the strip. The form of chain illustrated is composed of a longitudinal series of rigid, metal links, pivotally connected together. The pivotal connections may include the solid pivot pins 52, and each link may include the two, transversely opposite, parallel side members 53 and 54 having bearings for the opposite, reduced and shouldered ends of the pivot pins 52, as readily seen in Figures 7 and 9. As illustrated, the feed-pins 55 are connected to the alternate links of the chain, but it is to be understood that each successive link of a chain of appropriate design may have its connected feed pin, as circumstances may require. The pin-mounting links each has a transverse brace member 56 connecting the side members 53 and 54 of this link, the link thus being of general arch-shape transversely of the chain. The brace 56 lies in a plane outside of and spaced from the pivot pins 52, and said side members each has a laterally projecting pin support or arm 57 of rigid metal to which the pin 55 is affixed. The side members 53, 54, the laterally projecting arm 57 and the brace 56 are shown as being bent or shaped from integral metal. For retaining the pivot pins 52 in place, the side members of the links have plates 58 and 59 lying thereagainst in axial alignment with the pivot pins 52. The plate 58 may, as shown, be a bent portion of the side member 53 of the pin-mounting link. The plate 59 may, as shown, be separate from the side member 54 and secured thereto by a rivet or in any other practical manner.

In the chain type of pin-guiding member, a very satisfactory and efficient form of link with feed pin affixed thereto is obtained by projecting the combined pin-supporting and strip-supporting arm 57, from the outside of the link at a level below the imaginary line 62 (see Fig. 11) through the pivotal axes 52, 52, of the link, or below or inside the pitch-line of the chain, and erecting the feed pin on such arm, and terminating the pin at substantially the level or plane of said line 62, or said pitch-line, the main body of the pin lying inside or below line 62, or said pitch-line. (See Fig. 21.) By pivoting together a succession of links, including these carrying and utilizing the pivots 52 as teeth to cooperate with the teeth of the sprocket wheels 47, the axes of the pins will assume the desired positions for cooperation with the record strips and the apertures as explained. It is to be understood that for different thicknesses of strip or strip-assemblage, different lengths of pins may be provided and the position of the bases or roots of the feed sections of the pins relative to said imaginary line 62 may be varied accordingly. In Fig. 11 the straight sections of this imaginary line 62 indicate the chain links. At a straight reach of the chain, this line 62, through the opposite pivotal axes of a single link corresponds, in the construction illustrated, to the line of centres of the pivotal axes or pitch-line of the chain, hereinafter further described. In the curved reach of the chain, the imaginary line 62 through the pivotal axes 52 of a single link intersects the curved arc or pitch circle 60, through which the pivotal axes move, thus forming a chord to the pitch circle 60. It will be seen that, for the same length of link, the radial distance of the centre of this chord from the pitch circle varies inversely as the diameter of the pitch circle; that is this chord approaches closer to the pitch circle as the diameter of the pitch circle is increased and becomes more remote as such diameter is lessened.

By varying the diameter of the pitch circle or the length of the individual links the radial distance of this chord line from the pitch circle may be varied. Hence in different constructions the pins carried by the links may be made to travel on curves of longer or shorter radii with consequently more or less approach to travel in an arc corresponding to the pitch circle. In this way it becomes possible to cause the terminals of the pins to travel very close to the arc of the pitch circle, and their bodies or feed sections or shafts are positioned inside the pitch circle. Also in a chain of pivotally connected links passing around wheels or other curved supports having their axes spaced apart, as for instance illustrated in Fig. 2, where the axis of shaft 15 is spaced from the axis of shaft 16, a length of link, diameter of pitch circle and position of pin may be selected whereby the shift of the outer terminal of the pin relative to the pitch circle, or curved pitch line, as the pins advance in feeding, will be such that with the pivotal movement between the links, the pin-mounting arms 57 and the terminal of the pin, will be caused to move outwardly toward the pitch line as the links advance toward the record strip and toward the intermediate, or tangential, reach of the chain, and similarly moves inwardly thereof, as the link recedes from the record strip; this action during the operation of the feeding mechanism automatically eases the pins into the apertures by a relatively smooth straightening up of said pins after initial registry, and a similar relatively smooth angular movement eases the pins out of the apertures at the delivery end of the feeding mechanism. And furthermore, the aperture engaging and entering terminals of the pins, advance at substantially the same velocity around the wheels as they do along the reach of the chain between the wheels, and the pins and strip move at the same relative speed during the aperture engaging action of said pins and during disengaging action. Thus very accurate registration of the pin-terminals with the centers of the feed-apertures in initiating engagement may be effected, and apertures of small tolerance relative to the pins may be used and are indeed preferred.

By reference to the drawings, and especially to Fig. 2, it will be observed that the reach of the chain longitudinally between the sprocket-wheels 47 at either end of block 45 extends along and is generally parallel to the path of the strip and that the chain has a part curving around the sprocket-wheels in a path deviating from the path of the strip; the circular path before mentioned. When the chain is in operative position on the frame member and sprocket-wheels, the teeth 64 of sprocket-wheels cooperate with the pivot pins 52 to drive the chain in the path mentioned, the pitch-line of the sprocket wheels with reference to the chain being circular, and the pitch-line of the chain or line of centers of the pivotal connection between the chain links, where the chain lies between the sprocket wheels, being a continuation of such circular part of the pitch-line and merging with the latter and being substantially tangential thereto. It is to be understood, however, that this invention, in its broader aspects, is not limited to supporting the flexible band, or carrier, as for instance the chain, on sprocket-wheels, nor to truly circular paths of travel around the supports of the band, and may be realized whether sprocket-wheels or small drums or other practical instrumentalities be employed for supporting and guiding the band, as for instance the chain, in a path deviating from the path of the strip. The sprocket-wheels, however, support the chain and its connected feed-pins 55 for travel therearound smoothly, in a uniform path and with a uniform rate of movement and also directly cooperate with the pivot pins 52 to drive the chain and the feed-pins 55 affixed thereto. In the preferred practical arrangement, the one employing the chain type of band, the chain surrounds the sprocket-wheels 47 and the frame block 45 and is endless, as shown, so that the same feed pins may constantly recur in strip feeding relation. The distance between the two shafts 15 and 16 on which the sprocket-wheels are mounted may be relatively small, so that this pin-feed mechanism is well adapted to be embodied as a small, efficient, strip feeding unit of recording machines of the character referred to and lends itself ready for operation in recording machines of various different designs without detracting from the appearance or customary use and operation of such machines.

The relation of the laterally projecting arms 57, which directly carry the feed pins and which also serve as strip supports, constitutes an important feature of the invention, these laterally projecting arms having their pin supporting parts lying inside the line of centers through the successive pivot pins 52 of the chain, or pitch-line of the chain, the pins 55 being mounted on the arms 57 and extending therefrom outwardly toward said pitch-line or, more accurately, the pitch surface since the pins are positioned to one side of the chain and the pitch-line thereof. For the present purposes the pitch surface may be defined as the imaginary surface lying substantially perpendicular to the direction of the length of the feed pins or approximately parallel to the axes of rotation of the sprockets or other rotary supporting elements, and passing through and defined by the pitch-line.

The strip supporting device may take different forms when the invention is considered in its broader aspects. In the present embodiment the strip supporting device includes a series of flexibly connected strip supports, or supporting members, being the plates or arms 57, each of which is connected to a link of the chain to travel with the chain, these plates being flexibly connected together through the pivot pins 52 of the chain. The plates 57 are also disposed inside the plane of the outer edge or outer surface of the chain, as for instance inside the plane in which the braces 56 of the links lie or move, and the strip rests upon the plates 57 as it is fed through the feeding mechanism. Thus the weight of the plates 57 and the weight of this portion of the strip are, as it were, suspended from the band or chain, with resultant stability of the moving strip and plates 57, in addition to a lowering of the path of the strip supports to points inside said line of centers of the pivots 52, or more strictly the pitch surface of the chain as above referred to. Thus the strip and the strip supports are, as it were, suspended from a plane outside the pitch-line and the pins may initiate their engagement with the strip at the pitch-line or substantially thereat, and the complete interengagement of the pins and apertures effected much in the manner of the action of efficiently designed gear teeth. In this wise relatively accurate registry and clean interengagement of the pins with the strip apertures is effected so that apertures having diameter of small size relative to the diameters of the feed-sections of the pins may be used. This lowering of the strip path and of the feed-pins, at the tangential reach of the chain or band, is cooperative for effecting initial engagement and accurate registry of the feed-pins with the feed apertures and of efficient disengagement of the pins from the feed apertures in the strip, and tends greatly to lessen the chance of injuring or crumpling the edges of the feed apertures; it is also promotive of the efficient use, without injuring the apertures thereof, of record strips in which the tolerance or difference in diameter between the pins and apertures may be very small. Tolerance may be chosen which is sufficient only to allow the pins and apertures easily to engage each other. A tolerance of one-sixty-second of an inch is sufficient in many instances.

The strip supports 57 are included in arms laterally projecting from the chain at the inner or lower edges of the links, as illustrated in Fig. 5. Relative wide flat stiff or metal plates 57 are preferably employed, so as each to support the strip, especially around the apertures and where the bases or roots of the feed-pins 55 are affixed to the plates 57.

The shafts or bodies 61 of the feed-pins 55 should be of sufficient length to make feeding engagement with each of relatively superposed independent strips which may be involved in the assemblage of strip material being fed. In the preferred embodiment the strip engaging and feeding length, or the feed sections 61 of the respective pins, are disposed to travel inside the pitch-line or pitch surface of the chain, or said line of centers of the pivots of the chain, and so that the strip-engaging-and-feeding sections may terminate substantially coincident with said pitch surface. Although termination of the pins at the pitch-line or pitch surface provides an efficient arrangement, especially for a single strip, it is desirable that the terminals of the pins extend a short distance outside said pitch-line and be beveled or otherwise reduced in cross-section outside said pitch-line, especially when a relatively large number of superposed strips are employed. In Fig. 21 the feed section of the pin is shown as extending from the imaginary straight line 62 to the strip support 57, the terminal of the pin being beveled, as by being domed or rounded for a minimum distance outside the line 62.

As the feed mechanism of the present invention operates very satisfactorily with either a single strip or a plurality of superposed strips, it is to be understood that the term "strip" as used herein refers to either arrangement, save as the context may otherwise indicate. Whereas the terminals of the pins may be arranged to travel in the plane of the pitch-line or pitch surface, especially where one or a thin assemblage of superposed strips is being fed, initial interengagement of a relatively thick assemblage, or a relatively large number of superposed strips is facilitated, and injury to the edges of the apertures lessened or entirely eliminated by beveling or otherwise reducing the diameter of the pins at their terminal positions. In this wise, though the terminals may enter the bottom strip at an angle to the plane of the strip, the beveled terminals readily pass through the assemblage as far as need be and without injuring the edges of the apertures. Slight inaccuracies of machine work in the pins and in positioning them are thus counteracted by the reduced terminals. The bodies or feed sections of the pins are preferably cylindrical and these cylindrical sections preferably extend to the aforesaid plane of the pitch-line, the reduced terminals extending outside such plane. Some slight latitude of position of the feed-sections and of the reduced terminals relative to the plane of the pitch-line is permissible, especially should feed apertures materially larger in diameter than the feed sections of the pins be employed.

Referring to the diagram Fig. 11, it will be observed that the rounded terminals of the pins at the straight reach of the chain are slightly outside the pitch-line on the straight reach, whereas these terminals lie inside the pitch circles 60 as they move in a curved path around the sprocket-wheel. Nevertheless, because the terminals are close to the pitch circle or pitch surface, these terminals travel at substantially the same velocity around the pitch circle as they do along the straight reach, as the design may be such that the difference in velocity is inappreciable in practical effect. This functioning of the pins arranged as described is particularly advantageous in effecting the entry of the pins into the strips or apertures thereof, and the emergence of the pins from the apertures, because at the moment that the pin enters an aperture or emerges therefrom it is traveling at substantially the same speed as the strip and consequently there is little or no tendency of the pin to bind against the strip material or to cause tearing or fraying or other injury thereto.

Also by locating the main bodies or strip-engaging strip-feeding sections or shafts of the pins at a level or plane inside said pitch-line, not only does it become possible to dispose the aforesaid terminals close to and, if desired, accurately in the plane of the pitch-line, but a sufficient length of pin body may be employed in said relation to engage and pass through relatively superposed feed apertures of a large number of superposed strips without extension of the pin body above, or outside, said pitch-line, and with very favorable results in respect to accurate control, registry and feed of the strips. It will also be perceived that the lower face of the record strip, or of an assemblage of strips, may be located so as to intersect the central longitudinal plane of the pin-guiding element where it bends or curves around its support. In the flexible chain construction of pin-guiding member as shown in Figures 1 to 5, this central plane corresponds with the plane or surface of movement of the axes of the pivots of the links in passing around the sprocket-wheels, and thus corresponds with the pitch-line. In the tangential part of the path the longitudinal line or plane through the pivotal axes of the links is a tangential continuation of their circular path, so that, for the chain, this line through the line of centers of the pivotal axes may also be termed the pitch-line of the chain, being straight where the path of the pivots is straight and curved where the path of the pivots is curved, as shown in Fig. 11, where the pivots are indicated at 52, the links being indicated by the respective straight lines 62 joining the pivots. In passing around the sprocket-wheel this curved line of centers of the pivotal axes 52 corresponds to the pitch-circle or pitch-line of the sprocket-wheel.

By initiating entry of the pin into the strip where the strip lies in a plane intersecting the circular or otherwise convexly shaped part of the pin-guiding element, the path of the strip leading to and through the feed mechanism may be made a uniformly level path; the portion of strip in feed engagement with the pins drawing substantially straight from off the platen or other supporting part. In other words, the pins, as they enter the aperture, may be arranged to have little or no action to deflect the strip out of its straight or uniform path, nor to injure the strip-apertures. Similar results follow when the strip emerges from the feed mechanism; that is, the strip may be delivered from the feed mechanism with little or no deflecting action on the strip, or injury to the strip apertures.

The section or transverse line of the strip which is to receive the imprint of the type may thus be accurately aligned relative to the printing point or printing line of the platen; the line or point directly opposite the type-bars 10. When a multiple strip, one composed of a plurality of relatively superposed strips attached together is employed, as for instance illustrated in Fig. 2, aligning action occurs as in a single strip. Alignment of attached strips relative to each other is also assisted by the attachment between the strips and by the pins, so that the multiple strip feeds as would a single strip. The leading and rear faces of the pins are of proper shape and size to coact with the edges of the apertures so as not to injure the strip apertures; the feed sections or bodies of the pins being usually cylindrical or curved in cross-section and well filling the apertures, especially when independent strips are to be fed. When the strip is relatively thick, as when a large number of relatively superposed strips with apertures are used, it is desirable to taper or bevel or otherwise reduce the terminals of the pins as hereinbefore mentioned to ease the pins through the superposed apertures as initial entry of the pins into the apertures is effected, and this is especially desirable when the tolerance between the diameter of the apertures and the pins is small, as it may be according to the present invention. As many as eight superposed record strips with seven interleaved carbon strips have been successfully fed in accurately aligned relation by this construction, and it is felt that the number of superposed strips that may be successfully operated is limited only by the limitation of the copying effect of the carbon paper. When the relative diameters of apertures and pins is large, reduced terminals of pins may not be needed in all cases. Furthermore the pins act to align the apertures of unattached strips with each other, by shifting or permitting shifting of the apertures of different strips into alignment on the pins. In some cases the pins may be tapered lengthwise from their bases to their tips. Also pins with pointed terminals may be used.

The apertures in the strip are usually circular and relatively small in diameter and are spaced at equal distances apart along the strip. Also the apertures have predetermined relation to the printed forms on the strips, the same on one strip as on the others, so that the superposed printed forms will be in registry when the apertures are in registry.

In feeding superposed strips in a curved path, as around the cylindrical platen 4, outer strips take a longer path than inner strips with the result that the superposed registry of the printed forms may be disturbed by shift movement between the strips; typing on a line of the outer strip may not be copied in the same relation on the line of the underlying forms; also the extent of relative shift may accumulate as line spacing progresses. By the present invention the extent of relative shift and the extent of the accumulation thereof is much reduced and it has been found practical to employ a large number of relatively superposed record strips interleaved with transfer strips and nevertheless retain a most satisfactory registry of the typing at designed points on all the relatively superposed strips.

On the reach of the chain or band between the sprocket-wheels at either end of the block 45, a device may be employed to uphold or support the feed-pins 55 as they travel in their main feeding path between the sprocket-wheels. A practical and efficient arrangement for the purpose consists of a plate or track 70 having a smooth face on which the inner edges of the links may bear and also on which the arms or strip supports 57 may slide as they move between the sprocket-wheels. While very good results may be obtained without the use of such a support for the pins, its use is advantageous as stabilizing and assisting in confining the pins to their predetermined paths during the feeding of the strip.

By reference to Figures 2 and 11, it will be seen that the movable series of feed-pins are supported in relation to the platen 3 so that the strip makes feed engagement with the pins in a path or plane inside the path of travel of the pivotal axes of the links, or line of centers of such axes, and also inside the pitch-line of the chain, and also inside the pitch-line of the supporting and engaging sprocket-wheel. Thus the oncoming strip may enter the feed mechanism in a plane intersecting the pitch-line of the guiding chain, so that the initiation of entry of the pins into the aperture may be where the strip lies in such intersecting plane, and this may be the same plane as where the strip engages the pins inside the pitch-line or line of centers of the pivots 52 at the tangential part of the path of the pins. Such an arrangement conduces to the initiation of an engagement of the pins with the apertures in the strip without injuring the apertures or the strip itself.

It will be noted that a plurality of the feed pins lie along the tangential part of the path, or that part which is generally parallel to the strip and thereat are simultaneously in feed engagement with a plurality of the apertures in the strip inside the line of centers of the pivotal axes of the links, or pitch line of the chain. By such arrangement the pull of the pins on the strip is distributed among the plurality of apertures so that less strain occurs at any one aperture, and nevertheless the path of the strip is relatively low and in a line or plane inside the pitch-line of the chain. Thus the advance pins of the pin-feed series lead the strip into strip-feeding engagement with rear pins of the series and in a plane or path intersecting that of the pitch-circle or deviating part, the path of feed of the strip nevertheless being maintained inside the pitch-line or pitch surface at the tangential part of the strip-path.

As mentioned above the paths of travel of the feed pins and of the flexible carrier therefor, deviate from the path of strip travel substantially at the point where the pins are in the act of entering into strip engagement and also at the point of emergence of the pins from the strips. It will, of course, be understood that this refers to the deviation of the pins and flexible carrier angularly away from the surface of the strips, as can very readily be seen in Fig. 2 and also in Fig. 11. This deviation, together with the mounting of the feed transmitting pin shafts below the pitch surface of the flexible carrier, provides for the unobstructed and automatic entry of the pins into feeding engagement with the strips and similar emergence therefrom.

By reference to a part of the path of the pins as being "tangential" to the curved or circular or deviating part of their path it is to be understood that the tangential part need not be straight, though a straight tangential path is illustrated. Tangential merely connotes a straight path or a curved path of different degree from that around the curved support. In the embodiment illustrated the tangential path is substantially parallel to the path of feed movement of the strip through the pin-feed mechanism and the tangential path conforms to the path of the strip opposite thereto. Also it is to be understood that the deviating part of the path need not be circular and it is not necessarily curved.

The chain or band cooperates to guide the pins along the parallel and the curved parts of their path of movement. A device may be employed to cooperate with the outer face of the strip to assist in guiding the strip in its travel along the intermediate path between the sprocket wheels, and to assure retention of the strip on the pins during feeding. This guiding device may also assist in effecting initial engagement and maintaining engagement of the pins with the feed apertures, especially during rapid feeding. In the present embodiment this device includes a guide plate 71 which is located above or outside the tangential path of the strip and inside the pitch-line of the band or chain. As shown, this device may have a portion 72 which is adapted to act as a strip deflector and to urge the strip inwardly on the pins to a level inside the pitch-line of the band in case the ordinary tension of feed by the advance pins should not be sufficient. This deflector portion 72 may include a deflector plate or member lying in a direction crosswise of the plane of the strip and extending both outside the path of the strip and inside the outer edge of the band or chain and the pitch-line of the latter, as clearly shown in Fig. 2. As it is common in line spacing mechanism of machines of the character referred to, to feed the strip in either of opposite directions of line spacing, a strip deflector plate 72 is provided at each end of the guide plate 71. The guide plate 71 may be of sufficient length to extend substantially from adjacent the point of initial engagement by the pins to adjacent the point of disengagement of the pins from the strip. In the preferred embodiment and as illustrated, the guide plate 71 with its upturned ends providing the deflector plates 72, is shiftable into and out of operative position. As shown, it is carried by a relatively wide arm 74 pivoted at 75 to a member or frame piece 76 supported by the shafts 15 and 16 and the rod 17. The member 76 is mounted on said shafts and rod so as to be adjustable longitudinally of the latter to the desired position to enable the guide plate 71 to cooperate with the strip, and may be affixed in place by a suitable fastening device, as for instance a pin or pins (not shown) which may be similar to the pin 51 for fastening the frame block 45. A plate 77 having upstanding ears 78 is affixed by pins or screws 79 to the frame member 76, and the arm 74 is pivoted to these ears. Extending between the ears 78 is a bar or rod 79ᵃ and a bent, plate-spring 80 bears against the rod 79ᵃ and underlies a ball, or keeper, 81 affixed to the arm 74. Passing through the arm 74 is a screw 82, one end of which is adapted to bear against an extension or plate 83 secured to the top of the frame block 45. The spring 80 serves to urge and yieldingly retain the plate 71 in guiding position relative to the strip, and the exact position of the plate 71 may be determined by adjusting the screw 82 and locking the latter in its position of adjustment by the lock knot 84. The arrangement is such that the guide plate 74 may be lifted or rotated on its pivot 75 out of strip guiding relation, and retained in the latter position by the spring 80.

It is to be understood that the pin-feed mechanism of this invention may be located at any point relative to the strip where it will perform its designed action in respect to the strips as hereinbefore explained. In the present embodiment the shafts 15, 16 and 17 extend parallel to the platen 4 and for the full length of the platen, and a strip feeding mechanism according to this invention is located adjacent each of the opposite margins of the strip to be fed. Such arrangement is clearly shown in Fig. 1, the strip feeding mechanism clearly appearing at the left hand side of the strip. The similar strip feeding mechanism at the right-hand side of the strip is merely indicated, as by the dotted lines 86, as it is similar to that hereinbefore described. It is to be understood, however, that in many instances the pin-feed mechanism of the present invention may be located at one margin only of the strip without departing from the invention. When located at one margin of the strip, it is desirable to employ an edge guide as the member 43 for the opposite side of the strip, although an edge guide is not in all cases required. Also as clearly shown in Fig. 2 there is an edge guide member or flange 43 adapted to engage and guide the record strip or assembly of record strips such as shown in Figs. 17, 18 and 19 and thus to guide and position the strips in their path or course to the platen 4. This strip guide or flange 43 being thus positioned to the rearward of the platen functions to keep the strip or strip assembly in properly aligned position and to prevent lateral movements thereof when the strip feed is being exerted only at one longitudinal marginal portion of the strip assembly, as when a single pin feed mechanism positioned at one side only of the machine is being utilized as suggested. This arrangement is effective especially when cooperating in feeding relation with the multiple strip assembly such as shown in Fig. 19 where the strips are all attached together and the feed apertures provided only in one longitudinal margin.

As an auxiliary for supporting wide strips, the shafts 15 and 16 may be provided with the generally cylindrical, auxiliary supports 87 underlying the central portion of the strip to be fed. The surfaces of these auxiliary supports, or rolls, 87 may be smooth, but preferably they are knurled and, as they rotate with the shafts 15 and 16, they have some slight feeding as well as supporting effect on the strip. The peripheries of the auxiliary members 87 preferably are located in a plane inside that of the pitch-line of the band or chain.

It is to be understood that this invention may be embodied in constructions different from that utilizing the chain type of flexible pin carrier or pin-guiding member. Figures 13, 15 and 16 illustrate embodiments in which the pin-guiding member may be made of relatively flexible material. In Fig. 13 the pin-guiding member may be a relatively thick, endless belt or band 88 which may be composed of leather or canvas or other suitable strong flexible material capable of withstanding the strains to be undergone in feeding and aligning the strip, and the series of strip feeding pins 89 may be mounted on the band by means of substantially rigid brackets 90, which may be riveted to the underside of the band 88 so as to be fast to the belt, these brackets having portions 91 laterally projecting from the adjacent edge of the belt, each bracket thus having a combined strip-supporting and pin-supporting part (the part 91) which is disposed inside the line of connection of the belt, the bases of the pins being fast to the parts 91. The line of connection or surface of connection of the belt may be a central longitudinal plane or imaginary surface intermediate its upper and lower faces, as indicated by the dotted line 92. When the band is bent, as where it curves around the supporting sprocket-wheels 93 and 94, it develops a neutral axis which corresponds generally to a curved continuation of the line of connection 92. The terminals of the feed pins 89 are located in a plane substantially at the level of, or coincident, with the plane or surface of the neutral axis of the belt, the main bodies or strip-engaging and feeding sections of the pins being disposed inside the level or plane of the neutral axis, the pins pointing or extending from their bases, where they are fastened to the parts 91 of the brackets, in the directions of the level or plane of the neutral axis. For supporting and driving the belt 88, it may be mounted in contact with the rounded surface of the circular sprocket wheels 93 and 94, this rounded surface being indented or cut away to provide teeth 96 of the sprocket-wheels. The brackets 90 may project inwardly from the lower face of the belt to provide cooperative teeth on the belt for being engaged by the teeth of the sprocket-wheel for driving the belt.

In the form illustrated in Fig. 15 the construction is generally similar to that of Fig. 13, but the belt or band 97 is made of quite thin, strong material, such as thin steel, of such thinness that the neutral axis thereof, where the belt bends around the sprocket-wheel, is closely adjacent to the inner and outer faces of the belt. Thus in practical result, there is little distinction between the neutral axis and the inner and outer faces of such a thin belt 97. Hence the feed-pins 98, which may be similar in all respects to those described for the chain type of band, have their terminals substantially coincident with the plane of this thin belt, the main bodies or feed sections of these pins being inside the level or plane of the belt, or its thickness. Also in this form the same advantage is found in extending the reduced terminals of the pins some slight distance outside the outer face of the belt.

In Fig. 16 the belt 99 is very thin, as explained in connection with the belt of Fig. 15, but the feed-pins 100 are supported on brackets 101 which are affixed securely to the outer or top face of the belt 99, the belt 99 being supported upon the drums 102 and 103, these latter being provided with teeth 104, these teeth being pins fast on and projecting from the periphery of the drums 102 and 103, and coacting with the series of pin-feed openings 105 along the center line of the belt 99.

The construction of ratchet mechanism for rotating the platen 4 and the sprocket-wheel 20 and chain 19 for driving the pin-feed mechanism may be of conventional design. Referring to Fig. 20, the ratchet wheel 5, hereinbefore referred to, is actuated by a pawl 106, which latter in turn receives oscillatory movement from a lever 107, in turn actuated through the link connections 108 and 109 from the power actuating mechanism of the recording machine, as for instance the tabulating machine herein more specifically described. It is to be understood, however, that this same ratchet mechanism or devices of any suitable form for imparting intermittent rotary movement to the ratchet wheel 5 and controlling such wheel, may be used, as for instance the ratchet mechanism found in ordinary typewriters and various other types of recording machines.

In the chain type of band, it will be understood that the line of centers of the pivots 52 or pitch-line of the chain corresponds in general position to the line of connection hereinbefore mentioned in connection with the modifications of Figs. 13, 14, 15 and 16, and that the term "line of connection" pertains as well to the chain type.

It is to be understood that in the modified forms employing the band or belt of flexible material, as illustrated in Figures 13, 15 and 16, the construction is otherwise generally similar to that for the chain type of band; that is the sprocket wheels or drums of these modifications will be mounted at each end of a frame block having a track 70 on which the pin supporting plates travel, the frame block being supported on the shafts and rods 15, 16 and 17, as in Figures 1 to 5, and the outside strip guide 71 being associated in relation inside the level of the "line of connection," of the band.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a machine of the character described, in combination, strip feed pins for feeding a record or similar strip, a chain of pivotally connected links supporting said pins for movement in a path having a part lying along the strip path and another part whereat the paths of the strip and said pins deviate from each other, a support for said chain at said deviating part thereof, and attaching means attaching said pins on the chain links with the strip engaging, feed transmitting sections thereof positioned for travel in a path inside of the pitch surface of said chain and with the outer pin terminals adjacent to said pitch surface, so as to automatically ease said pins into feed transmitting engagement with the strip.

2. In a machine of the character described, in combination, strip feed pins for feeding a record or similar strip, a movable flexible pin guiding element movable with the pins in a path having a part lying along the strip path and another part whereat the paths of the strip and said pins deviate from each other, a support for said guiding element adjacent to said deviating part thereof, means for supporting said strip in a path intersecting the longitudinal path of the central part or neutral axis of said pin guiding element adjacent to said deviating part thereof, and means for supporting the strip engaging, strip feeding sections of said pins in a path inside of said longitudinal path of said central part of the pin guilding element so as to automatically ease said pins into feed transmitting engagement with the strip.

3. In a machine of the character described, in combination, strip feed pins for feeding a record or similar strip, a chain of pivotally connected links supporting said pins for movement in a path having a part lying along the strip path and another part whereat the paths of the strip and said pins deviate from each other, a support for said chain at said deviating part thereof, and attaching means attaching said pins on the chain links with the strip engaging, feed transmitting sections thereof positioned for travel in a path inside of the pitch surface of said chain and with the outer pin terminals adjacent to said pitch surface, so as to automatically ease said pins into feed transmitting engagement with the strip, the tops of said pins being substantially flat and of approximately the same diameter as the feed transmitting sections thereof.

4. In mechanism for feeding strips equipped with feed-apertures in recording and like machines, the combination of a series of strip-feeding pin adapted to engage in said apertures, a movable, flexible carrier to which said pins are operatively related for being driven by said carrier and provide a series of said pins projecting transversely of the path of feed movement spaced apart in their direction of feed movement, carrier supporting means, around which the carrier travels in a path having a part generally parallel to the path of strip movement and a part whereat the paths of the strip and carrier supporting means deviate from each other, and means cooperable for causing initial entry and automatic easing of the respective pins into said apertures where the strip and the terminals of said pins are inside the pitch surface of said carrier at said deviating part.

5. In a device of the character described, in combination, a flexible carrier member having a part lying along and substantially parallel to the path of movement of a strip being fed, and having a curved part deviating from said path, a rotary supporting element having a curved part engaging the curved part of said flexible member and being movable with the latter, strip-aperture-engaging feed pins carried by said carrier member in spaced relation therealong for feed engagement with spaced strip apertures, and means for causing the aperture-engaging parts of said pins to travel at substantially the same rate as that of the strip apertures at the time that the respective pins are entering the apertures in the transition from said curved part of the flexible member.

6. In mechanism for feeding strips equipped with feed-apertures in recording and like machines, the combination of a series of strip-feeding pins adapted to engage in said apertures, a movable flexible carrier to which said pins are operatively related for being driven by said carrier for effecting strip feed, carrier supporting means, on which the carrier travels in a path having a part generally parallel to the path of strip movement and a part deviating from the path of strip movement, and means, including a device for causing feed-sections of said pins to travel in their path of feed in a path inside the pitch surface of said carrier at said parallel part, for causing initial entry and automatic easing of the respective pins into said apertures and disengagement and automatic easing from the apertures at respectively different points in the path of the strip and at each said point when the strip and the terminal of the pin are at points inside the pitch surface of said carrier.

7. In recording machines for feeding and controlling a strip having a row of feed-apertures, the combination of line-spacing mechanism having a movable flexible band of strip-feeding pins adapted to enter and leave said apertures, means supporting and guiding said band to move said pins in an endless path and feed the strip, said path having a part parallel to the strip path whereat said pins are adapted to engage and feed the strip, and a part deviating from the strip path, and devices affixing said pins to said band to impart movement to the strip aperture entering and engaging parts of said pins at substantially the same linear velocity along said deviating part as along said parallel part of said path so as to automatically ease said pins into feed transmitting engagement with the strip.

8. In recording machines for feeding and controlling a strip having a row of feed-apertures, the combination of line-spacing mechanism having a movable flexible band of strip-feeding pins adapted to enter and leave said apertures, means supporting and guiding said pins to move in an endless path and feed the strip, said path having a part parallel to the strip-path whereat said pins are adapted to engage and feed the strip, and a part deviating from the strip-path, and devices affixing said pins to said band cooperable to impart movement to the strip aperture entering and engaging parts of said pins at substantially the same linear velocity along said deviating part as along said parallel part of said path so as to automatically ease said pins into feed transmitting engagement with the strip, the feed sections of said pins being inside the plane of the adjacent face of said band, and their terminals being laterally spaced from the said adjacent face.

9. In mechanism for feeding a strip having a row of feed-apertures, in recording machines, the combination of line-spacing mechanism having a movable band of flexibly connected, strip-feeding pins adapted to enter and leave said feed-apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links having laterally projecting arms lying inside the pitch surface or line of centers of the pivots of the chain, said pins being mounted on said arms and extending therefrom outwardly toward said line of centers so as to automatically ease said pins into the strip apertures as said pins move from the deviating path part to said parallel part thereof.

10. In mechanism for feeding a strip having a row of feed-apertures, in recording machines, the combination of line-spacing mechanism having a movable band of flexibly connected, strip-feeding pins adapted to enter and leave said feed apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links having laterally projecting arms lying inside the pitch surface or line of centers of the pivots of the chain, said pins being mounted on said arms and extending therefrom outwardly toward said line of centers so as to automatically ease said pins into the strip apertures as said pins move from the deviating path part to said parallel part thereof, and a retractably mounted strip guide positioned for guiding the strips into pin engaging position at said parallel part of the pin path opposite to said laterally projecting arms.

11. In mechanism for feeding a strip having a row of feed-apertures, in recording machines, the combination of line-spacing mechanism having a movable band of flexibly connected, strip-feeding pins adapted to enter and leave said feed-apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links, certain of said links having side members having laterally projecting arms on which said pins are mounted, said pin-mounting links each having a transverse, brace member connecting said side members in a plane outside of and spaced from said pivots.

12. In mechanism for feeding a strip having a row of feed-apertures, in recording machines, the combination of line-spacing mechanism having a movable band of flexibly connected, strip-feeding pins adapted to enter and leave said feed apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links, certain of said links having side members having laterally projecting arms on which said pins are mounted, said pin-mounting links each having a transverse, brace member connecting said side members in a plane outside of and spaced from the pivotal link connections, and a rigid frame having a smooth face on which said side members and arms of said links are adapted to slide during feed movement.

13. In mechanism for feeding a strip having a row of feed-apertures, in recording machines, the combination of line-spacing mechanism having a movable band of flexibly connected, strip-feeding pins adapted to enter and leave said feed apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links, certain of said links having side members having laterally projecting arms on which said pins are mounted, said pin-mounting links each having a transverse, brace member connecting said side members in a plane outside of and spaced from the pivotal link connections, said side members having plates lying thereagainst in axial alignment with said pivots, one of said plates being integral with said side membeor.

14. In mechanism for feeding a strip having a row of feed-apertures, in recording machines, the combination of line-spacing mechanism having a movable band of flexibly connected, strip-feeding pins adapted to enter and leave said feed-apertures, means supporting and guiding said band to move said pins in an endless path and feed the strip, said path having a part parallel to the strip-path whereat the pins are adapted to engage and feed the strip, and a part whereat the pins deviate from the path of the strip, said band comprising a chain of pivotally connected, rigid links, certain of said links having side members in which the pivotal link connections are centered intermediate the inner and outer edges of said members, said side members having laterally projecting arms on which said pins are mounted, said pins, in each link, extending outwardly from said arms so as to automatically ease said pins into the strip apertures as said pins move from the deviating path part to said parallel part thereof.

15. In mechanism for feeding strips equipped with feed-apertures in recording and like machines, the combination of a series of strip-feeding pins adapted to engage in said apertures, a movable belt of flexible material to which said pins are connected and providing a series of pins projecting transversely of the plane of feed movement spaced apart in their direction of feed movement, belt supporting means on which said belt travels in a path having a part generally parallel to the path of strip movement and a curved part whereat said belt deviates from the path of strip movement, feed sections of said pins being inside the level of the neutral axis of said belt at said curved part so as to automatically ease said pins into the strip apertures as said pins move from the deviating path part to said parallel part thereof.

16. In mechanism for feeding strips equipped with feed-apertures in recording and like machines, the combination of a series of strip-feeding pins adapted to engage in said apertures, a movable belt of flexible material to which said pins are connected and providing a series of pins projecting transversely of the plane of feed movement spaced apart in their direction of feed movement, belt supporting means on which said belt travels in a path having a part generally parallel to the path of strip movement and a curved part whereat said belt deviates from the path of strip movement, feed sections of said pins being inside the level of the neutral axis of said belt at said curved part, the terminals of said pins at said curved part lying, substantially, at or near to the level of the neutral axis of said belt at said curved part so as to automatically ease said pins into the strip apertures as said pins move from the deviating path part to said parallel part thereof, said pins being laterally spaced from said belt.

17. In mechanism for feeding strips in recording and like machines, the combination of line-spacing mechanism having a pair of sprocket-wheels whose axes are spaced apart, an endless sprocket chain of pivotally connected, rigid links surrounding said sprocket-wheels, said links having laterally projecting arms in planes inside that of the outer face of said chain, strip engaging and feeding pins fast on said arms and extending in the direction of the level of the outer face of said chain, a rigid frame member, each sprocket-wheel having concentric, connected, toothed, sprocket-wheel sections between which said frame-member lies, parallel shafts extending through said frame member and said sprocket-wheels, one of said shafts having driving connection with one of said sprocket-wheels, a stationary bracket, a frame supporting rod fixed to said bracket and said frame member, said frame member being adjustable to different positions longitudinally on said bar and parallel shafts.

18. In mechanism for feeding strips in recording and like machines, the combination of line-spacing mechanism having a pair of sprocket-wheels whose axes are spaced apart, an endless sprocket chain of pivotally connected, rigid links surrounding said sprocket-wheels, said links having laterally projecting arms at a level inside that of the outer face of said chain, strip-engaging and feeding pins fast on said arms and extending in the direction of the outer face of said chain, a rigid frame member having a track on which said arms travel between said sprocket-wheels, each sprocket-wheel having connected, toothed, sprocket-wheel sections between which said frame-member lies.

19. In mechanism for feeding strips equipped with feed-apertures in recording and like machines, the combination of a series of strip-feeding pins adapted to engage in said apertures, a movable, flexible carrier to which said pins are operatively related for being driven by said carrier, providing a series of said pins projecting transversely of the plane of feed movement spaced apart in their direction of feed movement, carrier supporting means, on which the carrier travels in a path having a part generally parallel to the path of strip movement and a part deviating from the path of strip movement, and means to cause a plurality of said pins to lie along said parallel part, simultaneously in feed engagement with a plurality of said apertures or points inside the pitch surface of said carrier so as to automatically ease said pins into the strip apertures as said pins move from the deviating path part to said parallel part thereof, means mounting said feed mechanism for cooperation with the feed apertures at one margin only of the strip, and an edge-guide for the strip at the other margin.

20. In mechanism for feeding strips equipped with feed-apertures in recording and like machines, the combination of a series of strip-feeding pins adapted to engage in said apertures, a movable, flexible carrier to which said pins are operatively related for being driven by said carrier, providing a series of said pins projecting transversely of the plane of feed movement spaced apart in their direction of feed movement, carrier supporting means, on which the carrier travels in a path having a part generally parallel to the path of the strip movement and a part deviating from the path of strip movement, and means to cause a plurality of said pins to lie along said parallel part, simultaneously in feed engagement with a plurality of said apertures at points inside the pitch surface of said carrier, rotatable strip-supporting rolls laterally spaced from said pin feeding mechanism, and means for actuating said rolls synchronously with the feeding pins to assist in feeding the strip.

21. In mechanism for feeding a strip in recording machines, the combination of the platen, strip-feeding mechanism having a movable series of strip-feeding pins and a flexible driving support for said movable series, and said series of pins being relatively disposed with reference to said flexible driving support so that the strip makes feed-engagement with the pins at points inside of said support so as to automatically ease said pins into feed transmitting engagement with the strip.

22. In a machine of the character described for feeding and controlling record strips, equipped with a row of feed-apertures, the combination of a band of strip-feeding pins, each pin adapted to engage in a feed-aperture in the strip, means adapted to move said band of pins in a path in part circular and in part tangential to its circular part and cause said pins to enter the apertures and to feed the strip by engagement, between the pins and apertures, in a plane inside the line of connection of the band at the tangential part of said path, a platen over which the strip passes, and means cooperable to initiate entry of said pin into a feed-aperture in the strip where the strip, between said platen and said tangential part of said path, is in a plane inside the line of connection of the band at said tangential part of said path, and to complete the entry by movement of the pins transversely of the path of the band and while the pins and strip are moving at the same relative speed of strip feeding movement so as to automatically ease the pins in their feeding action into feed transmitting relation with the strip apertures.

23. In mechanism for feeding a strip equipped with feed-apertures in recording and like machines, the combination of a movable endless belt of flexible material, a plurality of strip feeding pins each adapted to enter a feed-aperture in the strip, a series of substantially rigid brackets fast to said belt, projecting laterally therefrom and each having a combined strip-supporting and pin-supporting part in a plane inside the neutral axis of said belt so as to automatically ease the pins in their feeding action into feed transmitting relation with the strip apertures, the bases of said pins being fast to said combined part.

24. In mechanism for feeding strip equipped with feed-apertures in recording and like machines, the combination of a movable endless belt of flexible material, a plurality of strip feeding pins each adapted to enter a feed-aperture in the strip, a series of substantially rigid brackets fast to said belt, projecting laterally therefrom and each having a combined strip-supporting and pin-supporting part in a plane inside the neutral axis of said belt, the bases of said pins being fast to said combined part, said brackets having portions lying beneath said belt and forming sprocket teeth for cooperation with sprocket wheels supporting said belt.

25. In mechanism for feeding strip equipped with feed-apertures in recording and like machines, the combination of a movable endless belt of flexible material, a plurality of strip feeding pins each adapted to enter a feed-aperture in the strip, a series of substantially rigid brackets fast to said belt, said brackets having free or cantilever end portions spaced from the belt and projecting laterally therefrom and each having a combined strip-supporting and pin-supporting part lying inside the neutral axis of said belt so as to automatically ease the pins in their feeding action into feed transmitting relation with the strip apertures, the bases of said pins being fast to said combined part, said belt having pin-feed openings therein for cooperation with rotatable pin-wheels, supporting said belt.

26. A device for use in feeding record strips, having feed-apertures, in recording machines, comprising the combination of an endless chain of pivotally connected, rigid links, certain of which are pin carrying links, pin-supporting plates fast on and laterally projecting from each of said pin carrying links at points within the pitch surface or line of centers of the pivotal connections between the links, each said plate having a feed pin fast thereon and extending outwardly therefrom toward said line of centers, said feed pins being arranged in a series along said chain for cooperation respectively with the feed apertures, only one feed pin of said series being carried by each said pin carrying link.

27. In a machine of the character described, the combination of strip feed pins adapted to enter and to feed a strip, means, including a flexible member on which said pins are mounted, cooperable to move said member and pins in paths each having a curved part and a tangential part, strip-engaging strip feeding sections of the respective pins being disposed at points inside the pitch surface of said flexible member and the pin terminals being positioned adjacent to said pitch surface and to the outer parts of the respective strip feeding sections, so as to automatically ease said pins into or from feed transmitting engagement with the strip as they move between said curved and said tangential parts.

28. In a device of the character described, in combination, a flexible carrier member having a part lying along and substantially parallel to the path of movement of a strip being fed, and having a curved part deviating from said path, a rotary supporting element having a curved part engaging the curved part of said flexible member and being movable with the latter, pin supporting elements positioned along said flexible carrier member and having supporting parts disposed below the pitch surface thereof, and strip-aperture-engaging feed pins carried by said supporting parts and extending therefrom toward said pitch surface.

29. In a strip feeding mechanism, in combination, a traveling band of flexible material, band supporting and driving means, a plurality of supporting brackets attached at spaced points along said band and extending laterally therefrom, and strip engaging feed pins respectively attached to said supporting brackets and spaced laterally from the band, the laterally extending parts of said brackets being depressed to lie within the neutral axis of the band so as to automatically ease said pins into feed transmitting engagement with the strip.

30. A strip-feeding mechanism including, in combination, sprocket wheels having their axes spaced apart longitudinally of the direction of strip feed, one of said sprocket wheels including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections and having a free end spaced laterally from said chain, strip-feeding pins respectively mounted on said brackets, and a support positioned intermediate said sprocket wheels upon which said brackets bear during their feeding travel.

31. A strip-feeding mechanism including, in combination, a sprocket wheel including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections and having a free end spaced laterally from said chain, and strip-feeding pins respectively mounted on said brackets, each of said feeding pins being spaced inwardly from said sprocket wheel sections and positioned on the bracket at a point inwardly of the strip edge so as to engage feed apertures in the strip.

32. A strip-feeding mechanism including, in combination, a sprocket wheel including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections and having a free end spaced laterally from said chain, and strip-feeding pins respectively mounted on said brackets, said brackets being positioned below the points of flexible connection between the chain links and the said pins upstanding from said brackets.

33. A strip-feeding mechanism including, in combination, a sprocket wheel including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections, and strip-feeding pins respectively mounted on said brackets, said brackets being positioned below the points of flexible connection between the chain links and the said pins upstanding from said brackets, each of said feeding pins being spaced inwardly from said sprocket wheel sections and positioned on the bracket at a point inwardly of the strip edge so as to engage feed apertures in the strip.

34. A strip-feeding mechanism including, in combination, a sprocket wheel including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections, and strip-feeding pins respectively mounted on said brackets, the links of said chain respectively including side plates depending outside of said sprocket wheel sections, and the flexible connections between said links including pivotal pins connected to said side plates and each bearing at spaced parts thereof upon said sprocket wheel sections.

35. A strip-feeding mechanism including, in combination, a sprocket wheel including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections, and strip-feeding pins respectively mounted on said brackets, said brackets being positioned below the points of flexible connection between the chain links and the said pins upstanding from said brackets, the links of said chain respectively including side plates depending outside of said sprocket wheel sections, and the flexible connections between said links including pivotal pins connected to said side plates and each bearing at spaced parts thereof upon said sprocket wheel sections, and a support longitudinally spaced from said sprocket wheel upon which said pin brackets bear during their feeding travel.

36. A strip-feeding mechanism including, in combination, sprocket wheels having their axes spaced apart longitudinally of the direction of strip feed, one of said sprocket wheels including a set of sprocket wheel sections the sprocket teeth of which are spaced apart transversely of the direction of strip feed, a chain of flexibly connected links arranged for running in engagement with said sprocket wheel sections, each of a plurality of said links having a bracket laterally projecting therefrom at one side of said sprocket-wheel sections, and strip-feeding pins respectively mounted on said brackets, said brackets being positioned below the points of flexible connection between the chain links and the said pins upstanding from said brackets, each of said feeding pins being spaced inwardly from said sprocket wheel sections and positioned on the bracket at a point inwardly of the strip edge so as to engage feed apertures in the strip, the links of said chain respectively including side plates depending outside of said sprocket wheel sections, and the flexible connections between said links including pivotal pins connected to said side plates and each bearing at spaced parts thereof upon said sprocket wheel sections.

37. In a writing machine, in combination, a rotary platen for receiving record strips in writing position thereon, strip feeding mechanism including a longitudinal series of spaced strip engaging feed pins positioned for engagement with the strips to exert feeding effort only at one longitudinal margin of the strips, said feed pins being positioned to draw the strips into writing position on the platen while the opposite longitudinal margin of the strip is free of corresponding effort, said feed pins being positioned along the strip so that a plurality of longitudinally spaced pins simultaneously engage the strip in feeding relation therewith, and a strip guide positioned rearwardly of the platen in the strip path to engage with said strips to guide and align them during feeding movement.

38. In a writing machine, in combination, a rotary cylindrical platen for receiving in writing position thereon an assembly of long continuous interleaved manifolding strips connected together into a unitary composite manifolding assembly provided with a longitudinal series of feed apertures, strip feeding mechanism for said unitary manifolding assembly including a series of longitudinally spaced movably mounted feed pins positioned for feeding engagement with said apertures and for exerting tractive feeding effort only at one longitudinal marginal portion of said unitary assembly to draw the latter into writing position on said platen, while the opposite longitudinal marginal portion of said assembly is free from corresponding feeding effort, said feed pins being positioned in spaced relation along the assembly so that a multiplicity of longitudinally spaced pins simultaneously engage the strip in feeding relation therewith.

39. In a writing machine, in combination, a platen for receiving in writing position thereon an assembly of long continuous interleaved manifolding strips connected together into a unitary composite manifolding assembly provided with a longitudinal series of feed apertures, strip feeding mechanism for said unitary manifolding assembly including a series of longitudinally spaced movably mounted feed pins positioned for feeding engagement with said apertures and for exerting tractive feeding effort only at one longitudinal marginal portion of said unitary assembly to draw the latter into writing position on said platen, while the opposite longitudinal marginal portion of said assembly is free from corresponding feeding effort, said feed pins being positioned in spaced relation along the strip so that a multiplicity of longitudinally spaced pins simultaneously engage the strip in feeding relation therewith, and a guide for said unitary assembly positioned at the rear of said platen in the assembly path for guiding engagement with a longitudinal edge portion of the assembly.

40. In a strip feeding device, in combination, a feed chain including a longitudinal series of pivotally connected links, a longitudinal series of feed pins positioned for entry into feeding engagement with the strips being fed and respectively attached to and supported by said chain links, the strip aperture engaging, feed transmitting shaft of each said pin being positioned at points within the line of centers of the pivotal connections between the chain links, and means for driving said feed chain in a path along the strip path and also deviating from said strip path, only one feed pin of said series of pins being carried by each of said pin supporting links.

41. In a strip feeding device, in combination, a feed chain including a longitudinal series of pivotally connected links, a longitudinal series of feed pins positioned for entry into feeding engagement with the strips being fed and respectively attached to and supported by said chain links, the strip aperture engaging, feed transmitting shaft of each said pin being positioned at points within the line of centers of the pivotal connections between the chain links, and means for driving said feed chain in a path along the strip path and also deviating from said strip path, only one feed pin of said series of pins being carried by each of said pin supporting links, each said feed pin having a free end positioned adjacent to said line of centers and being tapered for entry into the strip apertures.

42. In a device of the character described, in combination, a feed chain having flexibly connected links, a rotary supporting sprocket over which the chain passes in a path deviating from the path of a strip being fed, strip-aperture-engaging feed pins spaced along said chain at the parts thereof lying adjacent to the strip path and at parts thereof in said deviating path, and means for mounting said pins on the links of said chain so that the parts of said pins moving into strip-aperture-engagement in their transition into the strip path are longitudinally spaced substantially the same as the aperture spacing and substantially the same as the feed-transmitting pin shafts in the strip path.

43. In a device of the character described, in combination, a flexible carrier member having a part lying along and substantially parallel to the path of movement of a strip being fed, and having a curved part deviating from said path, a rotary supporting element having a curved part engaging the curved part of said flexible member and being movable with the latter, pin-supporting elements positioned along said flexible carrier member and having supporting parts disposed below the pitch line thereof, strip-aperture-engaging feed pins carried by said supporting parts and extending therefrom toward said pitch line, the feed-transmitting shafts of said feed pins lying between said supporting parts and said pitch line, and said pins having free tapered end portions positioned beyond said pitch line from said supporting parts.

44. In a device of the character described, in combination, a flexible carrier member having a part lying along and substantially parallel to the path of movement of a strip being fed, and having a curved part deviating from said path, a rotary supporting element having a curved part engaging the curved part of said flexible member and being movable with the latter, strip-aperture-engaging feed pins spaced along said carrier member for feed engagement with spaced strip apertures, and means including pin-supporting elements positioned along said flexible carrier member for spacing the feed-transmitting aperture-engaging shafts of said pins lying along the strip path substantially the same as the aperture entering end portions of the pins at the curved part of the carrier member.

45. In a device of the character described, in combination, a feed chain having pivotally connected links, a rotary supporting member having a curved supporting part engaging said chain and strip-aperature-engaging feed pins carried by said chain and having aperture-engaging parts thereof positioned substantially at the pitch surface of said chain, and said pins having their strip-engaging, feed-transmitting shafts positioned below said pitch surface.

46. In a device of the character described, in combination, a feed chain having pivotally connected links, spaced supports including a rotary sprocket supporting said feed chain so as to provide support-engaging and intermediate chain reaches, and means for supporting strip-aperture-engaging feed pins on the links of said chain so that the strip-engaging entering parts of said pins at said support-engaging chain reach travel substantially at the same rate as that of the feed-transmitting parts of said pins at said intermediate chain reach.

47. In a device of the character described, in combination, a feed chain having pivotally connected links, a rotary supporting member having a curved supporting part engaging said chain, pin-supporting brackets carried by the links of said chain, and strip-aperture-engaging strip-feed pins carried respectively by said brackets and having their feed-transmitting, strip-engaging shafts lying between the supporting parts of said brackets and the pitch surface of the chain.

48. In a device of the character described, in combination, a feed chain having pivotally connected links, a rotary supporting member having a curved supporting part engaging said chain, pin-supporting brackets carried by the links of said chain, and strip-aperture-engaging, strip-feed pins carried respectively by said brackets and having their feed-transmitting, strip-engaging shafts lying between the supporting parts of said brackets and the pitch surface of the chain, said pins having free terminals positioned outside of said pitch surface and being tapered from points adjacent the pitch surface outwardly toward their free terminals.

49. In a device of the character described, in combination, a feed chain having pivotally connected links, a rotary supporting member having a curved supporting part engaging said chain and strip-aperture-engaging feed pins carried by said chain and having feed-transmitting aperture-engaging parts thereof positioned substantially at the pitch surface of said chain, said pins having unobstructed strip-aperture-engaging parts which are carried by said chain into the strip path, and a movably mounted strip-guide positioned for guiding engagement with the strips adjacent the path of said pins.

50. Strip feeding mechanism of the character described including, in combination, a series of pins adapted to enter apertures in the strip to feed the strip, a pin-driving belt movable in an endless path, and means supporting said pins on said belt with strip-feeding lengths of the pins inside the pitch surface of said belt.

51. Strip feeding mechanism of the character described including, in combination, a series of pins adapted to enter apertures in the strip to feed the strip, a pin-driving belt movable in an endless path, means supporting said pins on said belt with the outer terminal portions of their strip-feeding lengths substantially coincident with the pitch surface of said belt, and with their strip-feeding lengths inside said pitch surface.

52. Strip feeding mechanism of the character described including, in combination, a platen, an endless pin-driving belt mounted for movement toward and from the path of the strip being fed, a series of pins adapted to enter strip apertures to feed the strip, said pins being positioned in their feeding movements at one side of said platen so as to draw the feeding strips thereover, and pin supporting brackets carried at the inner side of the path of said belt and extending inwardly from points outside the adjacent edge of the strip being fed to and terminating at points inwardly of the strip edge, said pins upstanding from said brackets at parts thereof inwardly of the strip edge so as to engage feed apertures of the strip.

53. Strip feeding mechanism including, in combination, an endless pin-driving belt having a series of links, pivotal connections between adjacent links, a series of strip-engaging feed pins longitudinally spaced from each other at distances not greater than twice the longitudinal spacing of said pivotal connections, and a supporting bracket for each of said feed pins, said brackets being respectively carried by said links and extending from one side thereof into position overlapping the path of the strip.

54. Strip feeding mechanism including, in combination, an endless pin-driving belt having a series of links, pivotal connections between adjacent links, a series of strip-engaging feed pins longitudinally spaced from each other at distances not greater than twice the longitudinal spacing of said pivotal connections, and supporting brackets for said pins respectively carried by said links and extending from one side thereof into position overlapping the path of the strip, said brackets being positioned inside of said pivotal connections of the belt.

55. A strip feeding chain link having a transverse supporting plate and oppositely disposed side plates depending downwardly from the opposing ends of said supporting plate, said link having pivotal formations for pivotal connection to adjacent links, and a feed element supporting cantilever bracket carried by one of said plates and extending therefrom below said pivotal formations.

56. A chain link for pin feed chains, said link having a transverse supporting plate and oppositely disposed side plates depending downwardly from the opposite ends of said supporting plate, a pin-supporting cantilever bracket carried by one of said side plates and extending outwardly therefrom, and a strip aperture engaging pin supported by said bracket, said pin being spaced outwardly on said bracket from said supporting side plate so as to be positioned for engagement in strip-feeding relation in the apertures of a series of strip-feeding apertures arranged along the longitudinal margin of a strip being fed.

57. A strip-feeding chain link having a transverse supporting plate and oppositely disposed side plates depending downwardly from the opposing ends of said supporting plate, said link having pivotal formations for pivotal connection to adjacent links, a feed pin supporting cantilever bracket carried by one of said plates and extending therefrom below said pivotal formations, and a strip aperture engaging feed pin supported by said bracket, said pin being spaced outwardly on said bracket from said supporting side plate so as to be positioned for engagement in strip-feeding relation in the apertures of a series of strip-feeding apertures arranged along the longitudinal margin of a strip being fed.

58. In a machine of the character described, in combination, a rotary platen over which record strips pass in inscription receiving position thereon, supporting members extending transversely of the strip path rearwardly of said platen one of which is a rotary driving shaft, a support for said supporting members connected to the machine, a pin feed unit supported on said supporting members intermediate their ends and including rotary members having their axes spaced apart longitudinally of the strip path and each of which has its axis spaced to the rearward of said platen, one of said rotary members being a driving wheel connected to said rotary driving shaft and driven thereby, a traveling flexible feed pin carrying member mounted on said rotary members and driven in strip feeding movement by said driving wheel, a series of longitudinally spaced feed pins mounted upon said flexible member in position for feeding engagement with the strips, said pin feed unit having a rigid supporting frame member extending transversely of said transverse supporting members intermediate their opposite ends and having supporting connection therewith and providing a rigid structural supporting connection extending between said longitudinally spaced rotary members and connecting them together in the feed unit.

59. In a machine of the character described, in combination, a rotary platen over which record strips pass in inscription receiving position thereon, supporting members extending transversely of the strip path rearwardly of said platen one of which is a rotary driving shaft, a support for said supporting members connected to the machine, a pin feed unit supported on said supporting members intermediate their ends and including rotary members having their axes spaced apart longitudinally of the strip path and each of which has its axis spaced to the rearward of said platen, one of said rotary members being a driving wheel connected to said rotary driving shaft and driven thereby, a traveling flexible feed pin carrying member mounted on said rotary members and driven in strip feeding movement by said driving wheel, a series of longitudinally spaced feed pins mounted upon said flexible member in position for feeding engagement with the strips, said pin feed unit having a rigid supporting frame member extending transversely of said transverse supporting members intermediate their opposite ends and having supporting connection therewith and providing a rigid structural supporting connection extending between said longitudinally spaced rotary members and connecting them together in the feed unit, said pin feed unit being mounted on said supporting members for adjusting movement transversely of the strip path, means for retaining said pin feed unit in adjusted position on said supporting members, and a driving connection between said platen and said transverse rotary driving shaft to effect feeding movement of said flexible member and feed pins.

60. In a machine of the character described, in combination, a rotary platen over which record strips pass in inscription receiving position thereon, supporting members extending transversely of the strip path rearwardly of said platen one of which is a rotary driving shaft, a support for said supporting members connected to the machine, a pin feed unit supported on said supporting members intermediate their ends and including rotary members having their axes spaced apart longitudinally of the strip path and each of which has its axis spaced to the rearward of said platen, one of said rotary members being a driving wheel connected to said rotary driving shaft and driven thereby, a traveling flexible feed pin carrying member mounted on said rotary members and driven in strip feeding movement by said driving wheel, pin supporting brackets connected to and extending laterally from said flexible carrying member, a series of longitudinally spaced feed pins mounted upon said brackets in position for feeding engagement with the strips, said pin feed unit having a rigid supporting frame member extending transversely of said transverse supporting members intermediate their opposite ends and having supporting connection therewith and providing a rigid structural supporting connection extending between said longitudinally spaced rotary members and connecting them together in the feed unit, and a supporting and guiding plate for said pin supporting brackets connected to and supported by said rigid frame member and extending into supporting position under said brackets.

CARL ROBERT MABON.